(12) United States Patent
Rueb et al.

(10) Patent No.: US 7,385,180 B2
(45) Date of Patent: Jun. 10, 2008

(54) LASER PROJECTOR WITH BRIGHTNESS CONTROL AND METHOD

(75) Inventors: Kurt D. Rueb, Kitchener (CA); Edward S. Bianchin, Waterloo (CA)

(73) Assignee: Virtek Vision International, Inc., Ontario (CA)

( * ) Notice: Subject to any disclaimer, the term of this patent is extended or adjusted under 35 U.S.C. 154(b) by 0 days.

(21) Appl. No.: 11/421,610

(22) Filed: Jun. 1, 2006

(65) Prior Publication Data

US 2006/0273248 A1     Dec. 7, 2006

Related U.S. Application Data

(60) Provisional application No. 60/686,303, filed on Jun. 1, 2005.

(51) Int. Cl.
*G03B 21/14* (2006.01)
(52) U.S. Cl. .................. 250/234; 353/28; 353/121
(58) Field of Classification Search ........ 250/234–236; 353/28, 121
See application file for complete search history.

(56) References Cited

U.S. PATENT DOCUMENTS

| | | | |
|---|---|---|---|
| 5,646,859 A * | 7/1997 | Petta et al. ............ 700/95 | |
| 5,957,559 A | 9/1999 | Rueb et al. | |
| 6,000,801 A * | 12/1999 | Dillon et al. ......... 353/28 | |
| 6,011,255 A | 1/2000 | Rueb et al. | |
| 6,036,319 A | 3/2000 | Rueb et al. | |
| 6,050,693 A | 4/2000 | Rueb et al. | |
| 6,066,845 A | 5/2000 | Rueb et al. | |
| 6,654,171 B1 * | 11/2003 | Hampel-Vogedes ....... 359/618 |
| 6,731,991 B1 * | 5/2004 | Michalski et al. ............ 700/59 |
| 6,796,041 B2 * | 9/2004 | Amron et al. ............... 33/289 |
| 7,219,438 B2 * | 5/2007 | Amron et al. ............... 33/289 |
| 2005/0058332 A1 * | 3/2005 | Kaufman et al. ........... 382/133 |
| 2005/0082262 A1 | 4/2005 | Rueb et al. |
| 2005/0121422 A1 | 6/2005 | Morden et al. |
| 2005/0183273 A1 * | 8/2005 | Amron et al. ............... 33/289 |
| 2006/0016957 A1 * | 1/2006 | Hofmann ................. 250/201.1 |

OTHER PUBLICATIONS

International Search Report dated Sep. 24, 2007.

* cited by examiner

*Primary Examiner*—John R. Lee
(74) *Attorney, Agent, or Firm*—Howard & Howard Attorneys, P.C.

(57) ABSTRACT

A laser projector includes a laser, scanning mirrors projecting a laser line image on a surface, a computer including an algorithm controlling a speed of the laser line image, and a computer screen having a user interface. The user interface includes a throttle control which modifies the speed control algorithm permitting an operator to reduce the maximum speed of the projected laser line image using the throttle control, thereby improving the visibility of the laser line image. For example, a method of improving the visibility of a projected laser line image includes projecting a laser line image on a surface to determine the visibility of the laser line image and decreasing the maximum scanning speed of the projected laser line image if the visibility of the laser line image is insufficient.

17 Claims, 4 Drawing Sheets

LASER PROJECTOR WITH BRIGHTNESS CONTROL AND METHOD

CROSS-REFERENCE TO RELATED APPLICATION

The instant application claims priority to U.S. Provisional Patent Application Ser. No. 60/686,303, filed Jun. 1, 2005, the entire specification of which is expressly incorporated herein by reference.

FIELD OF THE INVENTION

This invention relates generally to laser projectors which are used by various industries to project a laser image in the form of a bright line image for assembly of components or alignment, and more particularly, to improvements in the visibility of laser line images.

BACKGROUND OF THE INVENTION

A conventional laser projection system typically includes a laser, a collimator, galvanometers and two angularly related scanning mirrors which receive the laser beam from the collimator and deflect the laser beam onto a surface, such as a work surface, for assembly of components or component alignment. The laser projector system typically further includes a computer employing algorithms for control of the laser image or template to be projected, including the projection speed, and so forth. With improvements to laser projector algorithms by the assignee of the instant application and improved performance of galvanometers that scan the laser beam, dramatic improvements have been made to the laser projector speed, reducing "flicker" of the pattern of the projected image. Flicker is generally defined as the visible flashing of the displayed pattern at regular intervals. These improvements have resulted in the ability of the laser projection system to project larger, more complex patterns without flicker, such as the pattern of a large complex truss system or images on a large aircraft, resulting in proportionally dimmer laser projections based upon the maximum laser energy permitted by regulation distributed over a larger area. Generally, as the projected laser line image becomes larger and more complex, the components begin to flicker. At the point that the image appears to begin flashing, the apparent brightness of the laser line image becomes constant and as additional projection information is added, the only visible change is a longer interval between flashes. While flicker of the projected laser line image is sometimes considered a disadvantage to operators, the projected image or laser pattern is still clearly visible and is actually more visible because the laser image is flashing. However, with the greatly improved projection speed, the pattern remains flicker-free, but becomes dimmer to the point of invisibility as additional pattern data is displayed, proportional to the overall length of the elements of the laser pattern or template.

There is therefore a problem with reduced visibility of projected laser line images particularly, but not exclusively, in projecting large complex patterns under ambient conditions.

SUMMARY OF THE INVENTION

In accordance with the general teachings of the present invention, the laser projectors and methods for using the same solve the aforementioned problem of reduced visibility of projected laser line images particularly, but not exclusively, in projecting large complex patterns under ambient conditions, by reducing the maximum scanning speed of the projected laser line image, thereby improving the visibility of the laser image or template.

In accordance with a first embodiment of the present invention, a method of improving the visibility of a projected laser line image is provided, comprising: (1) projecting a laser line image from a laser projector on a surface to determine the visibility of the laser line image; and (2) decreasing the maximum scanning speed of the projected laser line image if the visibility of the laser line image is insufficient.

In accordance with one aspect of the present invention, the method includes decreasing the speed of the laser line image by controlling a signal to the scanning mirrors of the laser projector to reduce the maximum speed of the scanning mirrors.

In accordance with another aspect of the present invention, the method includes decreasing the speed of the laser line image by limiting the maximum speed of a speed control algorithm of a computer controlling the laser projector.

In accordance with still another aspect of the present invention, a computer control of the laser projector projecting the laser line image includes a computer having a user interface. The user interface includes a throttle control which modifies a speed control algorithm which reduces the maximum speed of the scanning mirrors of the laser projector. By manipulating the throttle control to reduce the maximum speed of the projected laser line image, the visibility of the laser line image is thereby improved.

In accordance with still yet another aspect of the present invention, the method includes simultaneously decreasing the maximum scanning speed of multiple laser projectors.

Regardless of the specific methodology used in accordance with the general teachings of the present invention, decreasing the maximum scanning speed of the projected laser line image causes the laser line image to flicker.

In accordance with a first alternative embodiment of the present invention, a method of improving the visibility of a projected laser line image is provided, comprising: (1) projecting a laser line image from a laser projector on a surface; (2) determining the visibility of the laser line image; and (3) decreasing the maximum scanning speed of the projected laser line image if the visibility of the laser line image is insufficient; wherein decreasing the maximum scanning speed of the projected laser line image causes the laser line image to flicker.

In accordance with one aspect of the present invention, the method includes decreasing the speed of the laser line image by controlling a signal to the scanning mirrors of the laser projector to reduce the maximum speed of the scanning mirrors.

In accordance with another aspect of the present invention, the method includes decreasing the speed of the laser line image by limiting the maximum speed of a speed control algorithm of a computer controlling the laser projector.

In accordance with still another aspect of the present invention, a computer control of the laser projector projecting the laser line image includes a computer having a user interface. The user interface includes a throttle control which modifies a speed control algorithm which reduces the maximum speed of the scanning mirrors of the laser projector. By manipulating the throttle control to reduce the maximum speed of the projected laser line image, the visibility of the laser line image is thereby improved.

In accordance with still yet another aspect of the present invention, the method includes simultaneously decreasing the maximum scanning speed of multiple laser projectors.

In accordance with a second alternative embodiment of the present invention, a laser projector is provided, comprising: (1) a laser, scanning mirrors projecting a laser line image on a surface, a computer including an algorithm controlling a speed of said laser line image, and a computer screen having a user interface; and (2) said user interface including a throttle control which is selectively operable to modify the speed control algorithm, thereby permitting an operator to reduce the maximum speed of the projected laser line image using said throttle control, thereby improving the visibility of the laser line image.

In accordance with one aspect of the present invention, the throttle control is selectively operably to modify the speed control algorithm to reduce the maximum speed of the scanning mirrors.

In accordance with another aspect of the present invention, the computer controls a plurality of laser projectors and the throttle control of the user interface permits an operator to simultaneously reduce the maximum speed of the projected laser line image projected by the plurality of the laser projectors.

In accordance with still another aspect of the present invention, decreasing the maximum scanning speed of the projected laser line image causes the laser line image to flicker.

Further areas of applicability of the present invention will become apparent from the detailed description provided hereinafter. It should be understood that the detailed description and specific examples, while indicating the preferred embodiment of the invention, are intended for purposed of illustration only and are not intended to limit the scope of the invention.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE INVENTION

The following description of the preferred embodiment(s) is merely exemplary in nature and is in no way intended to limit the invention, or uses.

Figure 1:
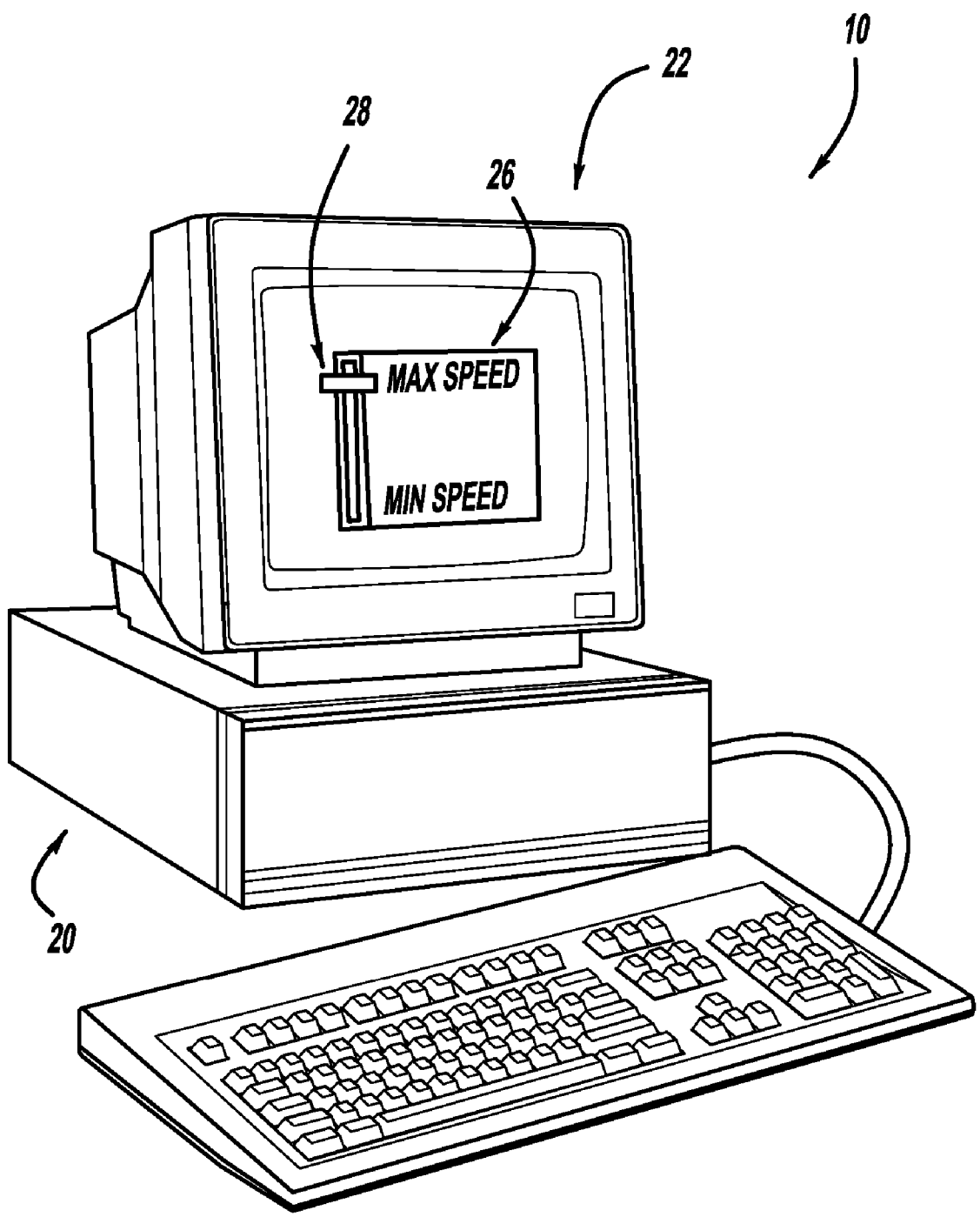
FIG. 1 illustrates a schematic view of a control system for a laser projection system, in accordance with a first embodiment of the present invention.

Referring to the Figures generally, and specifically to FIG. 1, there is illustrated a schematic view of a control system 10 for a laser projection system 12, in accordance with a first embodiment of the present invention.

As set forth above, the optical components of a conventional laser projector system 12 includes a laser projector 14, a collimator (not shown), galvanometers (not shown) and angularly related scanning mirrors 16 which receive the laser beam from the collimator and deflect the laser beam onto a surface, such as a work surface 18 and used for assembly of components or alignment. A conventional laser projection system 12 also includes power components, including a power supply (not shown) and electroservo controllers (not shown) for the galvanometers and a computer 20 including algorithms which control the laser projection system 12 including the speed of the projected laser line image. The computer 20 further includes a monitor 22 which displays information useful to the operator, such as part numbers, a drawing of the image projected, and so forth. The computer 20 may also control multiple laser projectors 14, particularly for large, complex laser projections. Co-pending U.S. patent application Ser. No. 10/961,599, filed Oct. 8, 2004, the entire disclosure of which is expressly incorporated herein by reference, discloses an improved temperature control for a laser projector, but also discloses the optical and power components of a laser projection system.

As set forth above, however, although improvements to laser projection systems has significantly increased the projection speed two to five fold, thus eliminating flicker of the laser line image and permitting scanning of large, for more complex laser line images, there is a corresponding decrease in the visibility of the laser line image as the size and complexity of the laser line image is increased. This is particularly true of portions of the projected laser line image which are rapidly traversed, such as long straight lines in a large complex laser projection.

In one preferred embodiment of the method of improving the visibility of a projected laser line image 24 of the present invention, the method includes projecting a laser line image 24 on a surface 18 to determine the visibility of the laser line image 24, and then decreasing the maximum scanning speed of the projected laser line image 24 if the visibility of the laser line image 24 is insufficient in portions of the projected image 24.

In another preferred embodiment, the method of this invention includes decreasing the maximum speed of the laser line image 24 by controlling the computer signal to the scanning mirrors 16 of the laser projector 14. This is preferably accomplished by modifying the control algorithm to reduce the maximum speed of the scanning mirrors 16. This algorithm is thus referred to as the speed control algorithm. Thus, the projection speed decreases in the fastest, dimmest portion of the display. As will be understood, decreasing the scanning speed of the projected laser line image 24 will increase the flicker of the projected laser line image 24. However, as set forth above, the flickering portion of the laser line image 24 actually becomes more visible to the operator.

By way of a non-limiting example, in it default form, the speed control algorithm limits the maximum speed of the galvanometers to a rate such that the electronics of the galvanometer control circuitry will operate in a controlled range (e.g., the power amplifiers do not "clip" the signal and all circuits operate in their linear range). In general, this maximum speed would be specified as a specified number of radians per second. For example, most control algorithms produce a control signal to the galvanometer in the form of a series of ramp signals with the maximum slope of any ramp determined by the maximum speed limit. For example, in accordance with one aspect of the present invention, the default maximum speed is about 460 radians/second. With the default limitations on maximum galvanometer speed, the galvanometers can reach very high speeds when large straight movements are performed (e.g., when the galvanometer has enough time to accelerate to the full speed of the ramp) resulting in poor visibility because the apparent brightness is very low. By limiting this maximum speed, the algorithm directly improves the visibility of these least visible segments.

Although the present invention provides a speed control system that also controls desired accuracy (e.g., how precisely the dynamic shape of the pattern matches the desired theoretical shape) and the total power consumption, it should be appreciated that the present invention can be practiced with any speed control algorithm that sets a maximum speed for the galvanometers.

In one preferred embodiment of the laser projector of this invention, the user interface 26 of the computer monitor 22 includes a "throttle control" 28 which may be used by the operator to control the maximum speed of the projected laser line image 24 as shown, for example, in FIG. 1. That is, the operator may use the throttle control 28 to decrease the maximum speed of the projected laser line image 24 to improve the visibility of the laser line image 24. It should be appreciated that the phrase "throttle control," as used herein, is meant to include any mechanism, system, or methodology for decreasing the maximum speed of the projected laser line image 24 regardless of mode of operation (e.g., electrically, mechanically, electromechanically, and/or the like).

Figure 2:
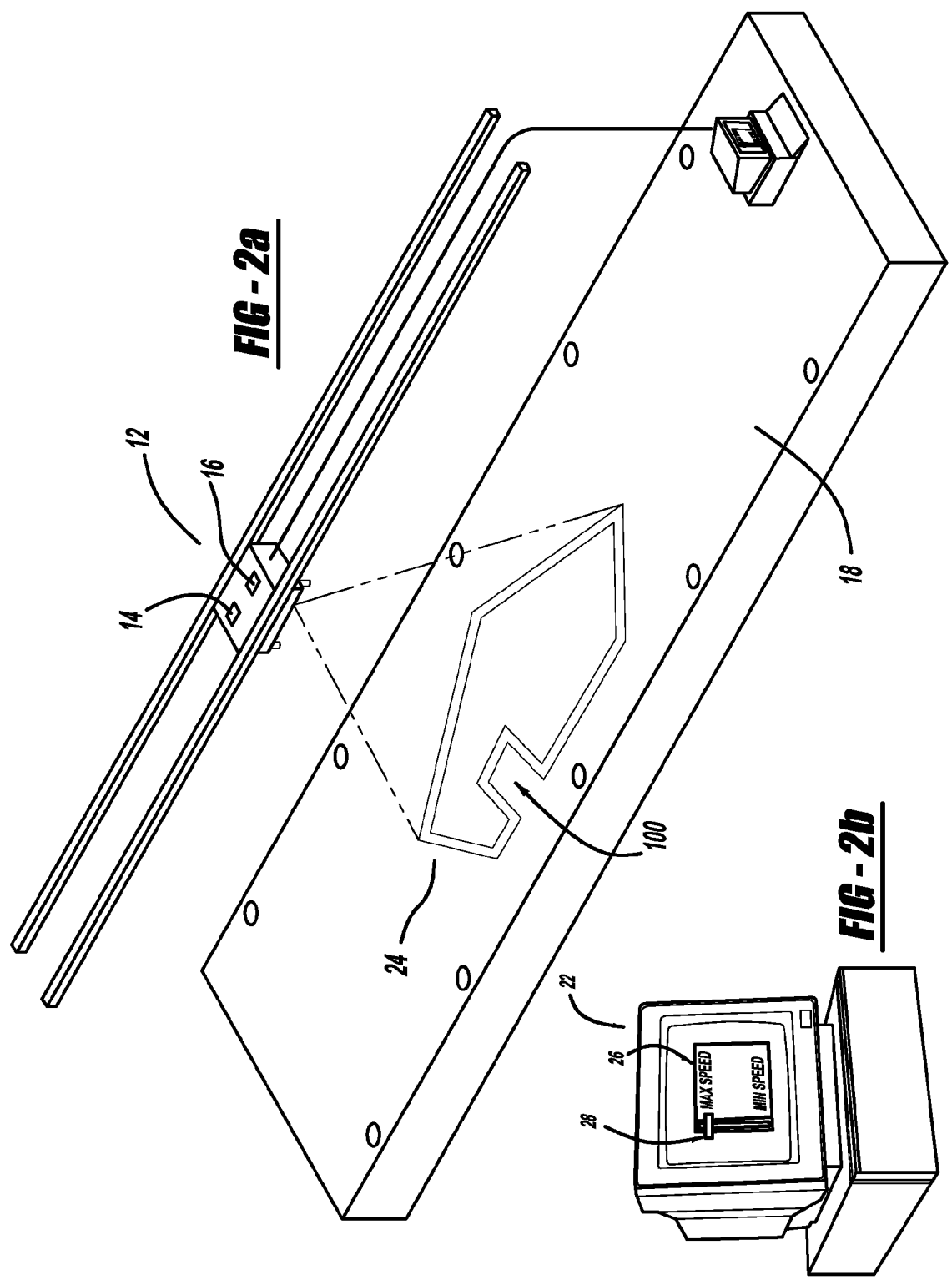
FIG. 2a illustrates a schematic view of a laser projection system wherein the laser line image includes dim portions, in accordance with a second embodiment of the present invention.
FIG. 2b illustrates a partial schematic view of a throttle system of the laser projection system depicted in FIG. 2a, wherein the throttle system is at or near the maximum speed setting of the laser projection system, in accordance with a second embodiment of the present invention.

Referring to FIG. 2a, there is illustrated a schematic view of a laser projection system 12 wherein the laser line image 24 includes at least one dim portion 100, in accordance with a second embodiment of the present invention. In this view, the speed of the projected laser line image 100 is at or near its maximum level (e.g., see FIG. 2b), which can be accomplished by using the throttle control 28 in order to modify the control algorithm to increase the maximum speed of the scanning mirrors 16 of the laser projector 14. It should be appreciated that either a portion of the projected laser line image 24 may be dim (e.g., as perceived by the operator) or the entire projected laser line image 24 may be dim (e.g., as perceived by the operator).

Figure 3:
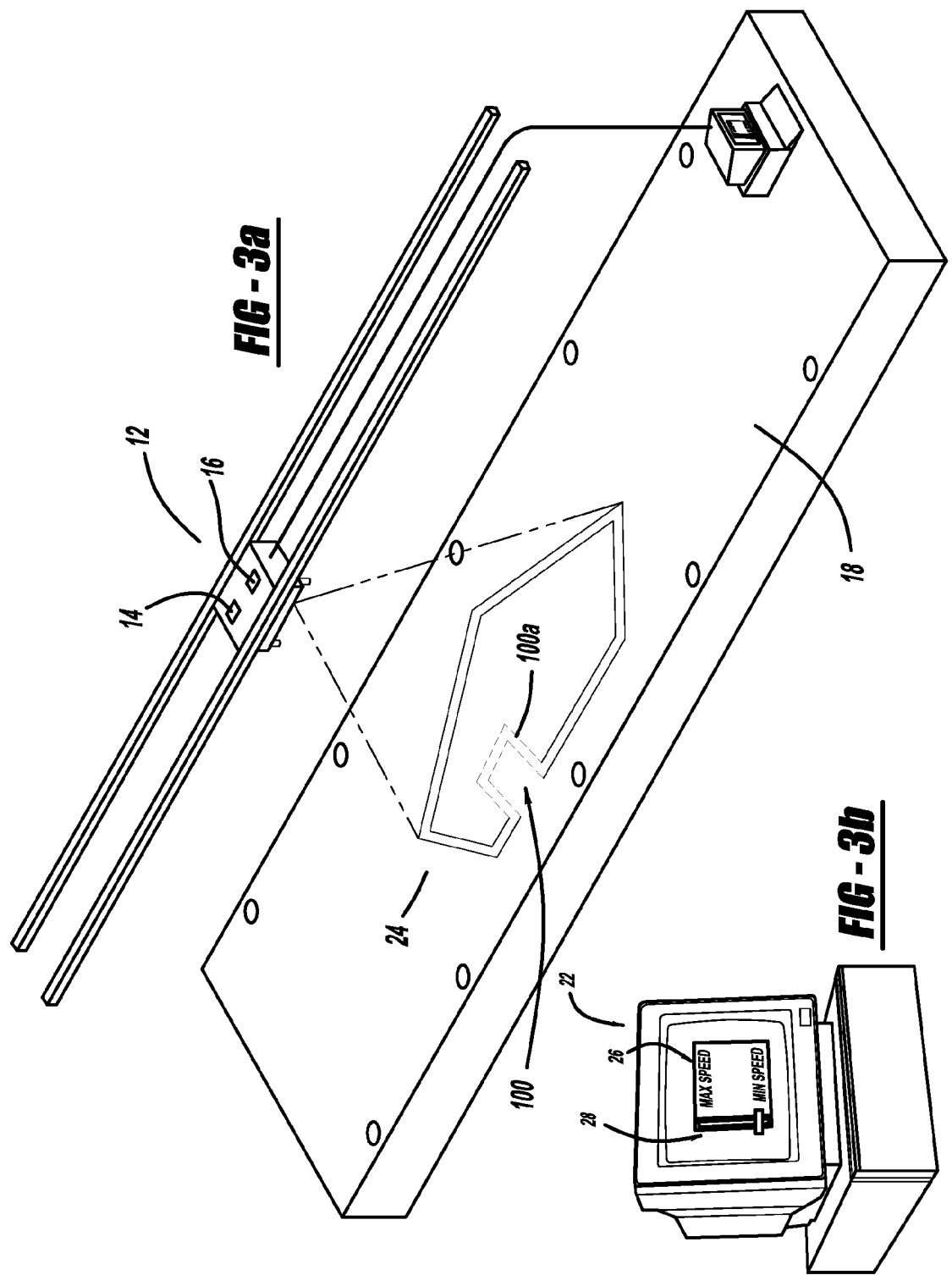
FIG. 3a illustrates a schematic view of a laser projection system wherein the projection speed of the laser projector has been decreased such that the dim portions of the laser line image flicker, in accordance with a third embodiment of the present invention.
FIG. 3b illustrates a partial schematic view of a throttle system of the laser projection system depicted in FIG. 3a, wherein the throttle system is at or near the minimum speed setting of the laser projection system, in accordance with a third embodiment of the present invention.

Referring to FIG. 3a, there is illustrated a schematic view of a laser projection system 12 wherein the projection speed of the laser projector 14 has been decreased to or near its minimum levels (e.g., see FIG. 3a) such that the dim portion 100 of the laser line image 24 flicker (as denoted by the dashed line segment 100a), in accordance with a third embodiment of the present invention. As previously noted, as the maximum projection speed decreases on the fastest, dimmest portion of the display, the visibility improves, but the flicker increases which, as set forth above, are not a problem.

Figure 4:
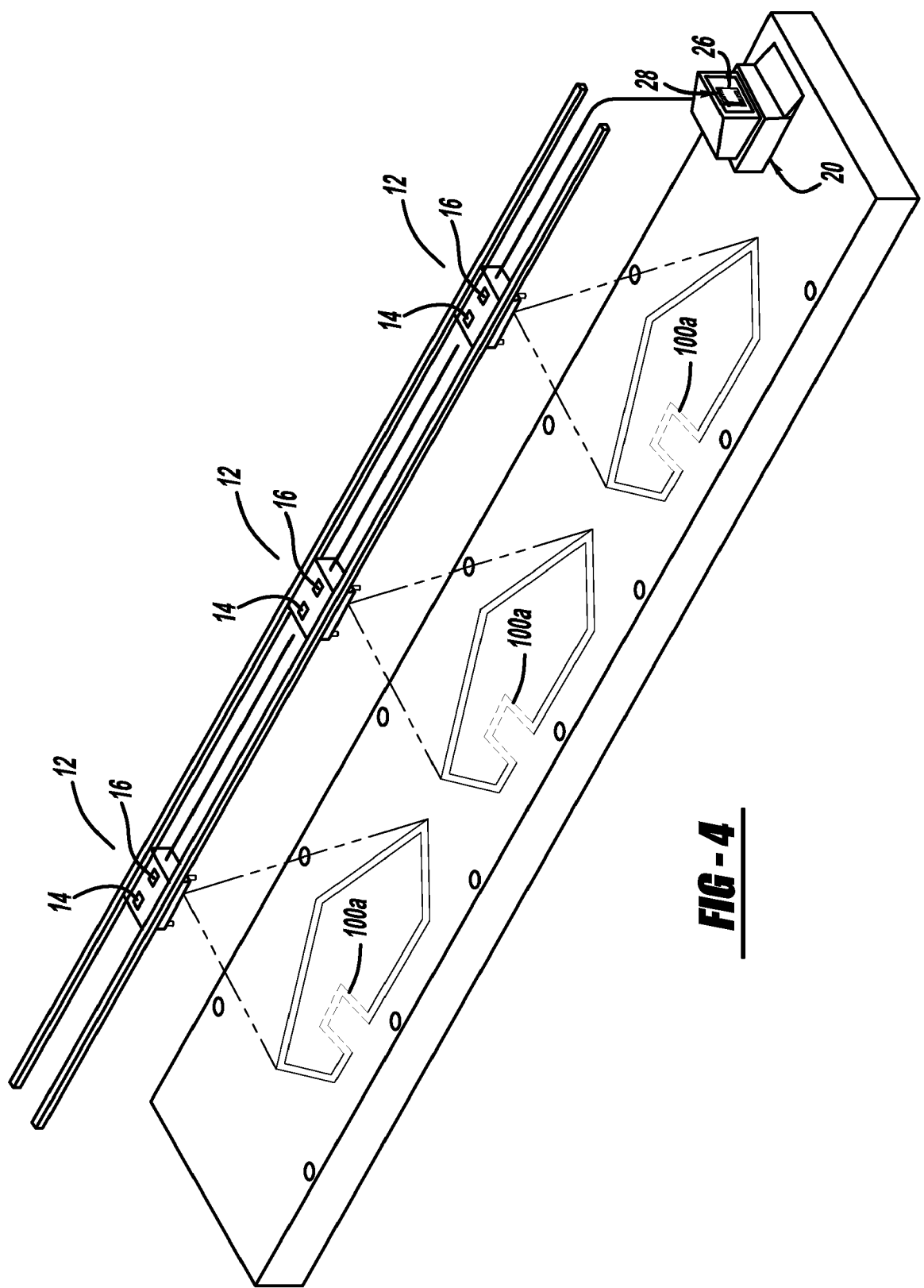
FIG. 4 illustrates a schematic view of a plurality of laser projection systems wherein the projection speed of the laser projectors can be controlled by a single operator from a single computer system, in accordance with a fourth embodiment of the present invention.

Further, the laser projector having a throttle control and method of the present invention may also be utilized to improve the visibility of multiple laser images or templates. Referring to FIG. 4, where a plurality of laser projectors 14 are controlled by a single computer 20, as described above, the throttle control 28 may be used to decrease the maximum speed of the projected laser line images 24 of the several laser projectors 14, thereby improving the visibility of the dim portions 100 of the laser line images 24 of the several laser projectors 14 simultaneously (e.g., by inducing a flicker effect as denoted by the dashed line segments 100a).

In accordance with one aspect of the present invention, the control process previously described relies on the subjective evaluation by the operator, which indeed is considered one of the benefits of the present invention as it demonstrates the ease of use of the throttle control on the user interface and the immediate impact on the projection provides a very easy methodology of optimizing visibility for the specific circumstances in which the operator is functioning. This is significant because visibility is dependent on many factors such as the light intensity in the room, the reflectivity of the projection surface, and characteristics of the pattern (e.g., the distance the operator is from the different areas of the projection field that he must able to view). By way of a non-limiting example, an operator working in a relatively dark environment in general will favor a lower flicker setting because the inherent visibility is higher. Conversely, an operator working in a relatively bright environment in general will favor a higher flicker setting because the inherent visibility is lower.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of improving the visibility of a projected laser line image, comprising:
   projecting a laser line image from a laser projector on a surface to determine the visibility of at least a portion of said laser line image; and
   decreasing the maximum scanning speed of said portion of said projected laser line image if the visibility of said portion of said laser line image is insufficient;
   wherein decreasing the maximum scanning speed of said portion of said projected laser line image causes said portion of said laser line image to flicker, thereby improving the visibility of said portion of said laser line image.

2. The invention according to claim 1, wherein said method includes decreasing the speed of said laser line image by controlling a signal to the scanning mirrors of said laser projector to reduce the maximum speed of said scanning mirrors.

3. The invention according to claim 1, wherein said method includes decreasing the speed of said laser line image by limiting the maximum speed of a speed control algorithm of a computer controlling said laser projector.

4. The invention according to claim 1, wherein a computer control of said laser projector projecting said laser line image includes a computer having a user interface.

5. The invention according to claim 4, wherein said user interface includes a throttle control which modifies a speed control algorithm which reduces the maximum speed of the scanning mirrors of said laser projector.

6. The invention according to claim 5, wherein said method includes manipulating the throttle control to reduce the maximum speed of the projected laser line image, thereby improving the visibility of the laser line image.

7. The invention according to claim 1, wherein said method includes simultaneously decreasing the maximum scanning speed of multiple laser projectors.

8. A method of improving the visibility of a projected laser line image, comprising:
projecting a laser line image from a laser projector on a surface;
determining the visibility of at least a portion of said laser line image; and
decreasing the maximum scanning speed of said portion of said projected laser line image if the visibility of said portion of said laser line image is insufficient;
wherein decreasing the maximum scanning speed of said portion of said projected laser line image causes said portion of said laser line image to flicker, thereby improving the visibility of said portion of said laser line image.

9. The invention according to claim 8, wherein said method includes decreasing the speed of said laser line image by controlling a signal to the scanning mirrors of said laser projector to reduce the maximum speed of said scanning mirrors.

10. The invention according to claim 8, wherein said method includes decreasing the speed of said laser line image by limiting the maximum speed of a speed control algorithm of a computer controlling said laser projector.

11. The invention according to claim 8, wherein a computer control of said laser projector projecting said laser line image includes a computer having a user interface.

12. The invention according to claim 11, wherein said user interface includes a throttle control which modifies a speed control algorithm which reduces the maximum speed of the scanning mirrors of said laser projector.

13. The invention according to claim 12, wherein said method includes manipulating said throttle control to reduce the maximum speed of said projected laser line image, thereby improving the visibility of said laser line image.

14. The invention according to claim 8, wherein said method includes simultaneously decreasing the maximum scanning speed of multiple laser projectors.

15. A laser projector, comprising:
a laser,
scanning mirrors projecting a laser line image on a surface,
a computer including an algorithm controlling a speed of said laser line image, and
a computer screen having a user interface;
said user interface including a throttle control which is selectively operable to modify said speed control algorithm, thereby permitting an operator to reduce the maximum speed of at least a portion of said projected laser line image using said throttle control, wherein decreasing the maximum scanning speed of said portion of said projected laser line image causes said portion of said laser line image to flicker, thereby improving the visibility of said portion of said laser line image.

16. The invention according to claim 15, wherein said throttle control is selectively operably to modify said speed control algorithm to reduce the maximum speed of said scanning mirrors.

17. The invention according to claim 15, wherein said computer controls a plurality of laser projectors and said throttle control of said user interface permitting an operator to simultaneously reduce the maximum speed of said projected laser line image projected by said plurality of said laser projectors.

* * * * *